United States Patent
Gopinathapai et al.

(10) Patent No.: US 11,451,554 B2
(45) Date of Patent: Sep. 20, 2022

(54) ROLE DISCOVERY FOR IDENTITY AND ACCESS MANAGEMENT IN A COMPUTING SYSTEM

(71) Applicant: Bank of America Corporation, Charlotte, NC (US)

(72) Inventors: Rajesh Gopinathapai, Aurora, IL (US); Jennifer Lynn Greenwald, Chicago, IL (US); David Patrick Harte, Hook (GB)

(73) Assignee: Bank of America Corporation, Charlotte, NC (US)

( * ) Notice: Subject to any disclaimer, the term of this patent is extended or adjusted under 35 U.S.C. 154(b) by 725 days.

(21) Appl. No.: 16/404,871

(22) Filed: May 7, 2019

(65) Prior Publication Data
US 2020/0358778 A1    Nov. 12, 2020

(51) Int. Cl.
| | | |
|---|---|---|
| *H04L 9/40* | (2022.01) | |
| *G06F 21/62* | (2013.01) | |
| *G06F 16/22* | (2019.01) | |
| *G06K 9/62* | (2022.01) | |
| *H04L 67/50* | (2022.01) | |

(52) U.S. Cl.
CPC ........ *H04L 63/102* (2013.01); *G06F 16/2246* (2019.01); *G06F 16/2272* (2019.01); *G06F 21/62* (2013.01); *G06K 9/6215* (2013.01); *H04L 63/104* (2013.01); *H04L 63/105* (2013.01); *H04L 67/535* (2022.05)

(58) Field of Classification Search
CPC ... H04L 63/102; H04L 63/104; H04L 63/105; H04L 67/22; H04L 67/306; G06F 16/2246; G06F 16/2272; G06F 21/62; G06F 21/604; G06K 9/6215; G06N 5/003
See application file for complete search history.

(56) References Cited

U.S. PATENT DOCUMENTS

| | | |
|---|---|---|
| 6,023,765 A | 2/2000 | Kuhn |
| 6,088,679 A | 7/2000 | Barkley |
| 6,785,686 B2 | 8/2004 | Boreham et al. |

(Continued)

OTHER PUBLICATIONS

M. Li, S. Yu, Y. Zheng, K. Ren and W. Lou, "Scalable and Secure Sharing of Personal Health Records in Cloud Computing Using Attribute-Based Encryption," in IEEE Transactions on Parallel and Distributed Systems, vol. 24, No. 1, pp. 131-143, Jan. 2013, doi: 10.1109/TPDS.2012.97. (Year: 2013).*

(Continued)

*Primary Examiner* — Jung W Kim
*Assistant Examiner* — Sameera Wickramasuriya
(74) *Attorney, Agent, or Firm* — Banner & Witcoff, Ltd.

(57) ABSTRACT

Methods, apparatuses, and systems are described for provisioning access rights in a computing system. A data structure may be created that corresponds to the access rights of a computing system. The data structure may be traversed to identify candidate bundles of access rights that correspond to patterns of access rights in the computing system. The candidate bundles of access rights may be evaluated to select one or more bundles to define as one or more roles in the computing system. The defined roles may then be provisioned to the users of the computing system as a replacement for the individual access rights. Various constraints may be applied to reduce the number of candidate bundles of access rights to evaluate.

20 Claims, 9 Drawing Sheets

(56) References Cited

U.S. PATENT DOCUMENTS

| | | | |
|---|---|---|---|
| 7,016,907 | B2 | 3/2006 | Boreham et al. |
| 7,130,839 | B2 | 10/2006 | Boreham et al. |
| 7,219,234 | B1* | 5/2007 | Ashland ............... G06F 21/604 726/16 |
| 7,403,925 | B2 | 7/2008 | Schlesinger et al. |
| 7,433,879 | B1* | 10/2008 | Sharma ................. G06F 16/54 707/999.005 |
| 7,467,414 | B2 | 12/2008 | Schlesinger |
| 7,650,633 | B2 | 1/2010 | Whitson |
| 7,685,123 | B1 | 3/2010 | Thompson et al. |
| 7,712,127 | B1 | 5/2010 | Thompson et al. |
| 7,873,614 | B2 | 1/2011 | Boreham et al. |
| 7,890,998 | B2 | 2/2011 | Lu et al. |
| 7,913,300 | B1 | 3/2011 | Flank et al. |
| 7,953,685 | B2* | 5/2011 | Liu .................... G06F 16/9027 706/45 |
| 8,042,150 | B2 | 10/2011 | Haswarey et al. |
| 8,117,643 | B2 | 2/2012 | Vidya et al. |
| 8,156,059 | B2 | 4/2012 | Dunning et al. |
| 8,161,173 | B1 | 4/2012 | Mishra et al. |
| 8,196,211 | B2 | 6/2012 | Vidya et al. |
| 8,271,527 | B2 | 9/2012 | Frieder et al. |
| 8,381,306 | B2 | 2/2013 | Mcpherson et al. |
| 8,402,514 | B1 | 3/2013 | Thompson et al. |
| 8,490,152 | B2 | 7/2013 | Staiman et al. |
| 8,533,168 | B2 | 9/2013 | Kuehr-McLaren et al. |
| 8,533,194 | B1* | 9/2013 | Ravid ................... G06N 20/10 707/736 |
| 8,578,507 | B2 | 11/2013 | Faitelson et al. |
| 8,806,486 | B2 | 8/2014 | Martin et al. |
| 8,983,877 | B2* | 3/2015 | Chari ................... G06F 21/604 707/738 |
| 9,026,949 | B1 | 5/2015 | Carmi et al. |
| 9,081,950 | B2 | 7/2015 | Jain et al. |
| 9,106,669 | B2 | 8/2015 | Faitelson et al. |
| 9,165,156 | B2 | 10/2015 | Wang et al. |
| 9,280,646 | B1 | 3/2016 | Nandyalam et al. |
| 9,325,721 | B2 | 4/2016 | Begum et al. |
| 9,660,997 | B2 | 5/2017 | Faitelson et al. |
| 9,912,672 | B2 | 3/2018 | Faitelson et al. |
| 9,916,461 | B2* | 3/2018 | Kapadia ............... G06F 21/604 |
| 10,812,482 | B1* | 10/2020 | Xu ......................... G06F 21/604 |
| 11,178,154 | B1* | 11/2021 | Balber ................... G06N 3/126 |
| 2002/0026592 | A1* | 2/2002 | Gavrila ................ G06F 21/6218 709/229 |
| 2003/0028531 | A1 | 2/2003 | Han et al. |
| 2006/0218394 | A1 | 9/2006 | Yang |
| 2007/0089162 | A1 | 4/2007 | Park et al. |
| 2007/0240231 | A1 | 10/2007 | Haswarey et al. |
| 2008/0120302 | A1 | 5/2008 | Thompson et al. |
| 2008/0168063 | A1* | 7/2008 | Whitson ............... G06F 21/604 707/E17.031 |
| 2008/0320549 | A1* | 12/2008 | Bertino ................ G06F 21/604 726/1 |
| 2009/0144803 | A1* | 6/2009 | Schreiber .............. G06F 21/604 726/1 |
| 2010/0325684 | A1 | 12/2010 | Grebenik et al. |
| 2012/0131646 | A1 | 5/2012 | Chandolu et al. |
| 2012/0180137 | A1 | 7/2012 | Liu |
| 2012/0246098 | A1* | 9/2012 | Chari ..................... G06N 20/00 706/12 |
| 2013/0111583 | A1* | 5/2013 | Hernandez .......... G06F 21/6218 726/21 |
| 2014/0129268 | A1* | 5/2014 | B'Far ............. G06Q 10/063112 705/7.11 |
| 2014/0196104 | A1* | 7/2014 | Chari ..................... H04L 63/102 726/1 |
| 2015/0319177 | A1* | 11/2015 | Lietz ..................... H04L 63/105 |
| 2016/0179903 | A1 | 6/2016 | Bittmann |
| 2016/0180229 | A1* | 6/2016 | Agarwal ............. G06F 16/2282 |
| 2016/0182527 | A1* | 6/2016 | Lietz ..................... G06F 21/604 |
| 2016/0188898 | A1 | 6/2016 | Karinta et al. |
| 2017/0214696 | A1 | 7/2017 | Cleaver et al. |
| 2017/0295183 | A1* | 10/2017 | Movsisyan ........... H04L 63/105 |
| 2018/0052991 | A1 | 2/2018 | Levi et al. |
| 2018/0107695 | A1* | 4/2018 | Yang .................. G06F 16/2282 |
| 2018/0159862 | A1 | 6/2018 | Chen et al. |
| 2018/0212959 | A1 | 7/2018 | Mukherjee et al. |
| 2018/0234385 | A1 | 8/2018 | O'Neil |
| 2018/0246991 | A1* | 8/2018 | Miya ..................... H04L 63/102 |
| 2018/0253776 | A1* | 9/2018 | Iqbal ...................... G06Q 30/06 |
| 2018/0336218 | A1 | 11/2018 | Li et al. |
| 2018/0336256 | A1* | 11/2018 | Li ........................ G06F 16/2272 |
| 2019/0014085 | A1 | 1/2019 | Soliman et al. |
| 2019/0098012 | A1 | 3/2019 | Dong et al. |
| 2019/0312881 | A1* | 10/2019 | Dasgupta ............. H04L 63/104 |
| 2021/0243190 | A1* | 8/2021 | Bargury ................ G06N 3/08 |

OTHER PUBLICATIONS

P. Zhang, J. K. Liu, F. R. Yu, M. Sookhak, M. H. Au and X. Luo, "A Survey on Access Control in Fog Computing," in IEEE Communications Magazine, vol. 56, No. 2, pp. 144-149, Feb. 2018, doi: 10.1109/MCOM.2018.1700333. (Year: 2018).*

"CA Identity Governance—12.6.02CR1: Access Governance and RBAC." Retrieved from [https://docops.ca.com/ca-identity-governance/12-6-02-cr1/EN/getting-started/access-governance-and-rbac] on Apr. 4, 2019.

"Data Mining Algorithms In R/Frequent Pattern Mining/The FP-Growth Algorithm." Retrieved from [https://en.wikibooks.org/wiki/Data_Mining_Algorithms_In_R/Frequent_Pattern_Mining/The_FP-Growth_Algorithm] on Apr. 30, 2019.

"An FP-Growth Approach to Mining Association Rules." Soni et al. International Journal of Computer Science and Mobile Computing. vol. 2. Issue 2. Feb. 2013.

"FP-growth." Retrieved from [https://fenix.tecnico.ulisboa.pt/downloadFile/3//9571250081/licao_10.pdf] on Apr. 29, 2019.

* cited by examiner

300

Entitlement Table

|  | User 1 | User 2 | User 3 | User 4 | User 5 |
|---|---|---|---|---|---|
| Permission 1 | ✓ |  |  | ✓ |  |
| Permission 2 | ✓ | ✓ | ✓ | ✓ | ✓ |
| Permission 3 | ✓ |  |  |  |  |
| Permission 4 |  | ✓ |  | ✓ | ✓ |
| Permission 5 |  | ✓ |  |  |  |
| Permission 6 |  |  |  |  | ✓ |

Support Count Table

| Permission No. | Support Count |
|---|---|
| Permission 1 | 2 |
| Permission 2 | 5 |
| Permission 3 | 1 |
| Permission 4 | 3 |
| Permission 5 | 1 |
| Permission 6 | 1 |

Ordered Item Set Table

| Permission No. | Support Count |
|---|---|
| Permission 2 | 5 |
| Permission 4 | 3 |
| Permission 1 | 2 |
| Permission 3 | 1 |
| Permission 5 | 1 |
| Permission 6 | 1 |

| Ordered Permission Set Table ||
|---|---|
| User No. | Ordered Permission Set |
| User 1 | { Permission 2, Permission 1, Permission 3 } |
| User 2 | { Permission 2, Permission 4, Permission 5 } |
| User 3 | { Permission 2 } |
| User 4 | { Permission 2, Permission 4, Permission 1 } |
| User 5 | { Permission 2, Permission 4, Permission 6 } |

ROLE DISCOVERY FOR IDENTITY AND ACCESS MANAGEMENT IN A COMPUTING SYSTEM

TECHNICAL FIELD

Aspects of the present disclosure relate to computer and information security. More particularly, some aspects of the present disclosure relate to the prevention of unauthorized access to resources of a computing system, including the prevention of its use in an unauthorized manner. Specifically, some aspects of the present disclosure relate to provisioning and validation of access rights in a computing system.

BACKGROUND

Role-based access control (RBAC) is a method of providing access control in a computing system that grants users access to computing resource based on roles assigned to those users. The roles may indicate access rights to computing resources of the computing system. An access right may indicate a particular computing resource and a corresponding permission to access that computing resource. Various approaches have been utilized to define roles including top-down approaches and bottom-up approaches. In a top-down approach, a role engineer may define roles based on user attributes, the line of business, business division, business group, job code, and the like. This approach can be time consuming. In a bottom-up approach, users may be grouped based on their entitlement data or network access patterns, and roles may be suggested based on those user groups. Selecting a role from the suggested roles, however, is often subjective. Therefore there exists a need for an objective and efficient approach to identify groups of access rights that can be bundled together in corresponding roles for users.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to provisioning access rights in a computing system. The access rights assigned to the users of a computing system may exhibit underlying patterns such that sets of access rights may be grouped together in a bundle and used to define roles to assign to the users. By assigning the users roles corresponding to bundles of access rights, the number of individual access rights assigned to the users can be reduced in the computing system. The disclosures herein describe technique for identifying patterns in the access rights assigned to the users of a computing system. Such patterns may indicate the frequency with which a particular access right is assigned to the users, the frequency with which two or more access rights are assigned together, and the like.

The disclosures herein also describe techniques for identifying and evaluating bundles of access rights to be defined as a role. Constraints may be employed to limit the number of access right bundles considered for role definition. Evaluations may be performed to determine the impact the access right bundles would have on the access rights of a computing system if defined as a role and assigned in lieu of the individual access rights.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-G depict example output during an example role discovery process in accordance with one or more aspects described herein;

DETAILED DESCRIPTION

Figure 1A:
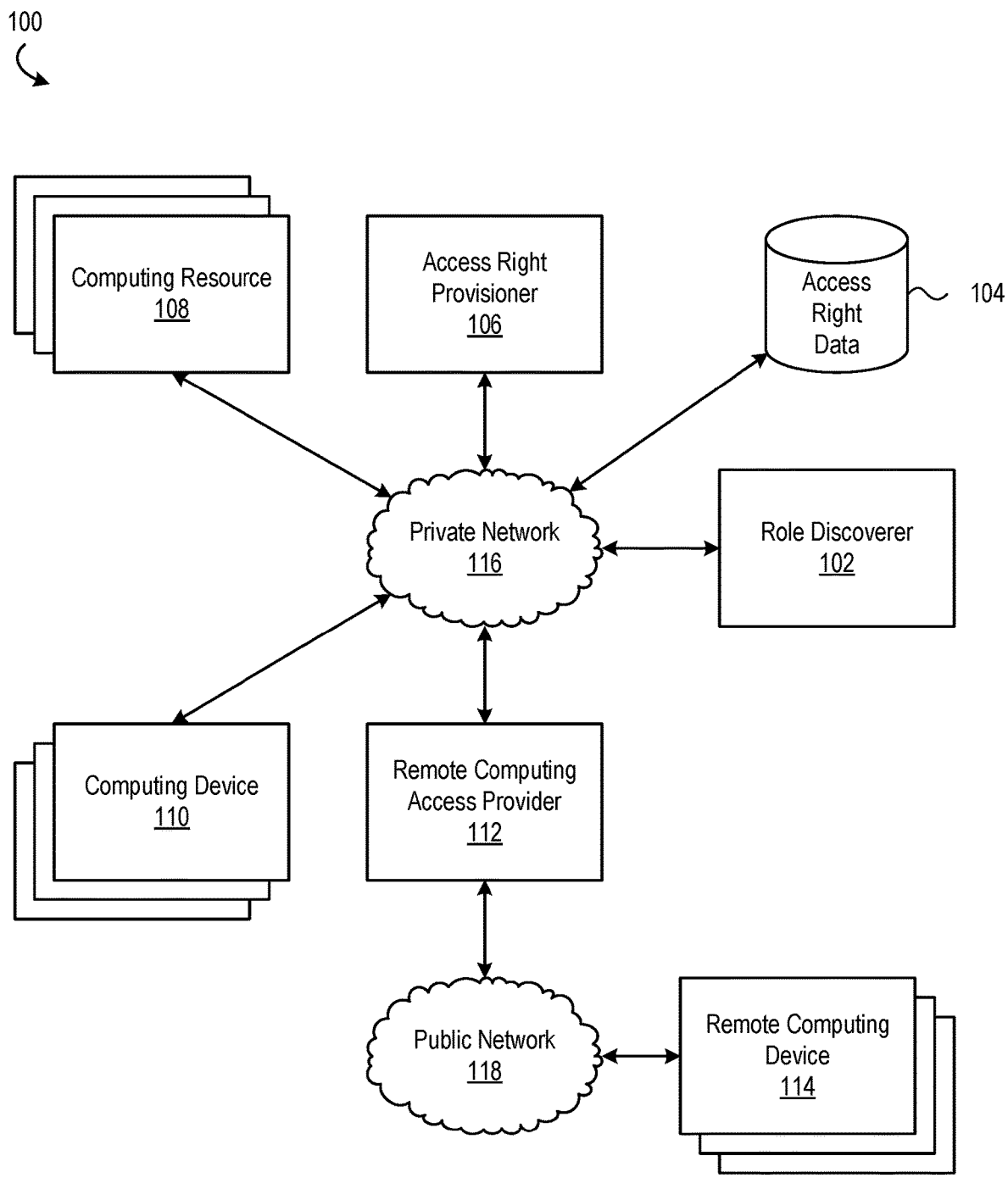
FIGS. 1A-B depict an example computing environment for implementing role discovery functions in accordance with one or more aspects described herein.

In the following description of various illustrative embodiments, reference is made to the accompanying drawings, which form a part hereof, and in which is shown, by way of illustration, various embodiments in which aspects of the disclosure may be practiced. Other embodiments may be utilized, and structural and functional modifications may be made, without departing from the scope of the present disclosure.

Various connections between elements are discussed in the following description. These connections are general and, unless specified otherwise, may be direct or indirect, wired or wireless, and that the specification is not intended to be limiting in this respect.

As discussed above, enterprises may provision users with various access rights to the computing resources of its computing systems. Computing resources may include hardware, software, data, interfaces, and other components of a computing system. Examples of computing resources include: computing devices and peripherals; applications, programs, and services; data, data stores, and database objects; and communication networks and application programming interfaces (APIs). Computing resources may also include the granular functionality or aspects of hardware, software, data, and the like. For example, a user may be granted access to view data but not modify it.

As used in this description, access rights generally refer to roles, entitlements, and permissions. A user may be assigned an entitlement that indicates a computing resource the user is entitled to access and the corresponding permission(s) for such access. Accordingly, an entitlement may indicate an association between a user, a computing resource, and a permission. A permission may refer to one or more actions (e.g., read, write, execute) the user may perform with respect to the computing resource. A user may be described, for example, as having an entitlement when an association exists between a user account, a resource, and a permission. It should be appreciated that, even though a user may have an entitlement, the user may not be able to access the computing resource until the entitlement is physically provisioned for the user account at the computer system, e.g., by establishing access credentials such as a username and password for the entitlement. A role may refer to a set of one or more permissions associated with one or more computing resources. The set of one or more permissions may be referred to as a bundle of permissions or a permission bundle. In an RBAC system, a user may be assigned a role, and that user's ability to access a particular computing resource may depend on whether the assigned role includes a permission to that computing resource.

In an enterprise-wide computing system, thousands if not millions of access rights are defined and/or provisioned for its users. In order to ensure the computing system remains secure, periodic reviews of those access rights are performed to reconcile the access rights provisioned for the users and the access rights those users are authorized to possess. The access rights users are authorized to possess may change over time, for example, as those users change job roles, move to new business divisions, and the like. Periodic reviews of such access rights thus allow an enterprise to identify access rights a user is not authorized to possess as well as access rights a user should, but does not currently, possess. Based on these access right reviews, the enterprise may take remedial measures to align the users' access rights with what they are authorized to possess. Such remedial measures may include granting and/or revoking permissions to computing resources of the computing system. It will be appreciated that, where an enterprise-wide computing system includes thousands or millions of access rights to review, significant time and effort is often required to complete such reviews and carry out any necessary remediation. Such efforts often demand the attention of many individuals across the enterprise (e.g., managers, IT personnel, and the like). And because access reviews are performed on a periodic basis, the demands imposed on those individuals is ongoing.

The disclosures set forth herein provide improved techniques for provisioning access rights in an enterprise-wide computing system that address the challenges discussed above. As described in greater detail below, aspects of the disclosures reduce the volume of access rights requiring review by identifying clusters of access rights (e.g., clusters of permissions) that frequently appear in the access rights provisioned for users of a computing system. Based on the frequent patterns identified with respect to those access rights, bundles of access rights (e.g., bundles of permissions) are proposed that encapsulate the frequently occurring sets of access rights. It should be appreciated that, while some bundles of access rights may include multiple access rights, a set of access rights as used herein may include at least one access right that is frequently observed among the users of a computing system. Accordingly, a bundle of access rights may likewise include at least one access right (e.g., at least one permission).

The disclosures set forth herein also provide technical efficiencies with respect to the use of computing resources for identifying, proposing, and evaluating bundles of access rights. Such technical efficiencies derive from eliminating from consideration certain combinations of access rights that would not yield a meaningful impact on the reduction of the access rights provisioned across the computing system. In other words, the techniques described herein avoid an exhaustive search and evaluation of all possible combinations and permutations of access rights for a computing system. It should be appreciated that, where a computing system includes thousands or millions of access rights, exhaustively searching and evaluating the entire universe of permutations and combinations would be computationally expensive on a massive scale and thus impracticable. The improved techniques described herein apply various constraints that reduce the size of the universe under consideration and thus reduces the volume of possible access right bundles to evaluate. Accordingly, a more efficient use of computing resources may be obtained by reducing the number of scans of the access right data when identifying possible access right bundles. In turn, those possible candidate bundles may be evaluated relatively faster using these techniques. Such efficiencies translate to a reduction in the processing and memory resources used to identify and evaluate possible bundles of access rights.

Accordingly, aspects described herein are directed to determining bundles of access rights. In some examples, a computing device may retrieve the access right data that constitutes the existing access rights for the users of a computing system. Existing access rights may include access rights actually provisioned for the users as well as access rights that a user is entitled to possess but might not be actually provisioned within the computing system. The computing device may then create a data structure (e.g., a tree data structure) corresponding to the access rights retrieved. The computing device may then traverse that data structure to identify frequently occurring patterns of access rights. The frequently occurring patterns of access rights may thus correspond to potential bundles of access rights that the computing device then evaluates to assess their impact on the existing access rights of the computing system. The computing device may then propose or select one or more potential bundles of access rights to provision for one or more users of a computing system. The selected bundle of access rights may, for example, be used to define a role within the computing system (e.g., a RBAC-based computing system). The defined role may then be deployed within the computing system and assigned to the relevant users as a replacement for a portion of their existing access rights. The identification of one or more roles based on bundles of access rights is referred to herein for convenience as role discovery. The identification of sets of access rights to bundle together in a role is similarly referred to herein for convenience as bundling.

These and various other arrangements will be discussed more fully below.

Figure 1B:
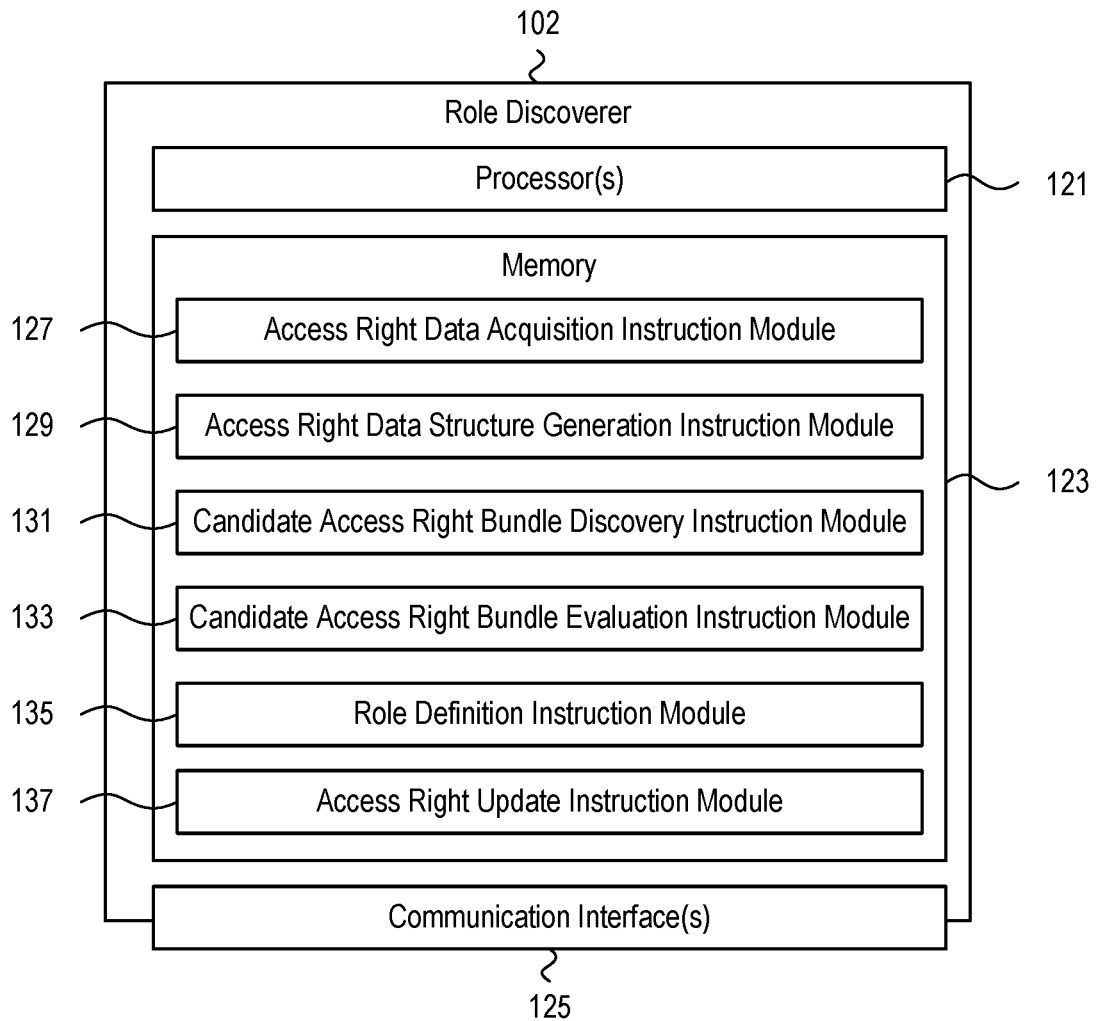

FIGS. 1A-B depict an example computing environment for implementing role discovery functions in accordance with one or more aspects described herein. Referring to FIG. 1A, computing environment 100 may include one or more computing devices. For example, computing device 100 may include a role discoverer 102, a data store 104 storing access right data, an access right provisioner 106, one or more computing resources 108, one or more computing devices 110, a remote access computing provider 112, and one or more remote computing devices 114. Although role discoverer 102, data store 104, and access right provisioner 106 are depicted separately in FIG. 1A, it should be appreciated that these may be implemented on a single computing device in some examples. It should also be appreciated that role discoverer 102 and/or access right provisioner 106 may be implemented using multiple computing devices (e.g., in a distributed fashion) in other examples. It should further be appreciated that data store 104 of access right data may similarly include multiple data storage units in some examples.

The role discoverer 102 may be configured to retrieve the access right data stored at the data store 104, identify frequent patterns of access rights based on the access right data retrieved, determine potential bundles of access rights based on the frequent patterns identified, evaluate the potential bundles of access rights determined, and determine roles based on the evaluations of the potential bundles of access rights. For instance, the role discoverer 102 may query or otherwise obtain, from the data store 104, access right data characterizing the access rights of the users of computing environment 100. The role discoverer 102 may also process the access right data obtained to generate a data structure that corresponds to the users' access rights. As discussed below with reference to FIG. 3E, the data structure may be a tree data structure that indicates groups of access rights provided to one or more of the users. The role discoverer 102 may traverse the data structure to identify frequent patterns of access rights. As noted above and discussed in more detail below, the role discoverer 102 may, when traversing the data structure, apply one or more constraints to limit the sets of access rights identified as potential bundles of access rights. Having identified potential bundles of access rights, the role discoverer 102 may evaluate the potential bundles of access rights identified. Such evaluation may include determining a confidence that the potential bundle of access rights should include a particular access right, determining a similarity between a potential bundle of access rights and the existing access rights respectively assigned (e.g., provisioned) to one or more users, and/or determining the impact the bundle would have if defined as a role to replace users' existing access rights. The role discoverer 102 may then select a potential bundle of access rights to propose as a role for an RBAC computing system. The role discoverer 102 may output proposed bundles of access rights and/or proposed roles, e.g., to an IT administrator via a display device. The role discoverer 102 may also provide a selected bundle of access rights to the access right provisioner 106.

The access right provisioner 106 may be configured to receive bundles of access rights and/or defined roles from the role discoverer 102, define roles based on received bundles of access rights, provision roles and/or access rights based on defined roles, and the like. For instance, the access right provisioner 106 may receive a bundle of access rights from the role discoverer 102, define a role based on the received bundle of access rights, and provision the role to one or more users of an RBAC computing system. Additionally or alternatively, the access right provisioner 106 may receive a defined role from the role discoverer 102 and provision the received role to one or more users of an RBAC computing system. The access right provisioner 106 may also be configured to update the access right data stored in the data store 104 when provisioning a role to a user of an RBAC computing system. Such updates may include creating and/or modifying access right data that indicates a user is assigned to the defined role. Such updates may also include modifying or deleting access right data to remove the access right(s) of the user that the defined role is intended to replace.

As described above, the data store 104 may be configured to store access right data for users of the computing environment 100. The access right data may include, for example, indications of provisioned permissions, indications of entitlements (e.g., entitlement specifications), indications of defined roles, and the like. As noted above, the access right data may indicate an association between a user, a computing resource, and a permission that authorizes the user to perform a function or engage in an interaction with the computing resource. The manner in which a computing system stores its access right data may depend on the particular architecture and configuration of the system. For instance, the data store 104 may store its access right data in the table(s) and column(s) of a relational database that is accessible using a database management system (DBMS). In some examples, the data store 104 may include the data storage units of the computing resources 108 themselves. Regardless of the particular way a computing system stores its access right data, however, the data store 104 may make the access right data accessible to other components of the computing environment 100, e.g., role discoverer 102, access right provisioner 106, and the like.

Users of the computing environment 100 may access the computing resource(s) 108 with computing device(s) 110 and/or remote computing device(s) 114. The computing device(s) 110 may include, for example, desktop computing devices, laptop computing devices, tablet computing devices, hand-held computing devices, smart computing devices (e.g., smart phones, smart televisions, and the like), digital media players, video game consoles, microconsoles, network appliances (e.g., gateways, routers, bridges, servers), and other types of computing devices that use and/or interface with the computing resources of a computing system.

The components of the computing environment 100 may be in signal communication with each other via one or more networks. For instance, a private network 116 may be associated with a particular enterprise (e.g., organization, corporate, financial institution, educational institution, governmental institution, family unit, or the like) and may interconnect one or more computing devices of the enterprise. In the computing environment 100 of FIG. 1A, for example, the private network interconnects the role discoverer 102, data store 104, access right provisioner 106, computing resource(s) 108, computing device(s) 110, and remote computing access provider 112. The private network 116 may include one or more sub-networks (e.g., Local Area Network(s) (LANs), Wide Area Network(s) (WANs), virtual private network(s) (VPNs), and the like). The remote computing access provider 112 may provide remote computing device(s) 114 with access to an enterprise's computing system via a public network 118. The public network 116 may also include one or more sub-networks including the Internet and cellular networks.

Referring to FIG. 1B, role discoverer 102 may include one or more processors 121, memory 123, and one or more communication interfaces 125. The memory 123 may include both volatile, short-term data storage devices (e.g., random access memory) as well as persistent, long-term data storage devices (e.g., a hard disk and/or hard drive). The communication interface(s) 125 may include a network interface configured to support communication between the role discoverer 102 and one or more networks (e.g., private network 116 and/or public network 118). The communication interface(s) 125 may also include human-machine interfaces configured for user input/output. Such human-machine interfaces may include various types of computer peripherals configured to receive user input (e.g., keyboard, mouse, stylus, touchscreen, and the like) and provide user output (e.g., display devices, audio devices, haptic devices, and the like).

The memory 123 may include one or more instruction modules having computer-readable and computer-executable instructions that, when executed by the processor(s) 121, cause the role discoverer 102 to perform one or more functions described herein and/or access one or more data stores that may store or otherwise maintain information that may be used by such instruction modules and/or processor(s) 121. In some instances, the one or more instruction modules and/or data stores may be stored by and/or maintain in different memory units of the role discoverer 102 and or by different computing devices that may for and/or otherwise make up the role discoverer 102.

For instance, the memory 123 of the role discoverer 102 in this example, includes an access right data acquisition instruction module 127, an access right data structure generation instruction module 129, a candidate access right bundle discovery instruction module 131, a candidate access right bundle evaluation instruction module 133, a role definition instruction module 135, and an access right update instruction module 137.

Access right data acquisition instruction module 127 may store instructions and/or data that may cause or enable the role discoverer 102 to obtain access right data (e.g., from data store 104) that characterizes the access rights assigned to users of a computing system. In some examples, such instructions may cause or enable the role discoverer 102 to access (e.g., query, lookup) a data store (e.g., data store 104) for the desired access right data. Additionally or alternatively, such instructions may cause or enable the role discoverer 102 to retrieve (e.g., query, crawl) the computing resource(s) 108 for access right data that characterizes the access rights assigned to users of the particular computing resource(s) 108.

Access right data structure generation instruction module 129 may store instructions and/or data that may cause or enable the role discoverer 102 to generate a data structure that corresponds to the access rights characterized by the access right data obtained by the access right data acquisition instruction module 127. As described in more detail below, the data structure may be a tree data structure. As also described in more detail below, the tree data structure may be generated in accordance with a Frequent Pattern (FP) Growth algorithm ("FP-Growth algorithm"). Such instructions may cause or enable the role discoverer 102 to store the generated data structure in its memory for subsequent processing.

Candidate access right bundle discovery instruction module 131 may store instructions and/or data that may cause or enable the role discoverer 102 to discover (e.g., identify, determine) candidate bundles of access rights based on the data structure generated by the access right data structure generation module 129. As described in more detail below, such instructions may cause or enable the role discoverer 102 to traverse the data structure (e.g., the tree data structure) to identify frequent patterns in the access rights assigned to users of the computing system. For instance, the instructions may cause or enable the role discoverer 102 to traverse a tree data structure corresponding to such access rights in accordance with an FP-Growth algorithm. The instructions may also cause or enable the role discoverer 102 to apply one or more constraints when traversing the data structure. Such constraints may be configured to exclude one or more potential bundles of access rights from the candidate bundle(s) of access rights identified by the role discoverer 102. The excluded bundle(s) of access rights may correspond, for example, to sets of access rights that are not desirable for role definitions, e.g., those that would not meaningfully impact the existing access rights assigned to users of a computing system. Examples of such constraints will be discussed in more detail below.

Candidate access right bundle evaluation instruction module 133 may store instructions and/or data that may cause or enable the role discoverer 102 to evaluate the candidate bundle(s) of access rights discovered by the candidate access right bundle discovery instruction module 131. As described in more detail below, such evaluation(s) may include determining a confidence that a particular access right should be included in a particular candidate bundle of access rights, determining a similarity between a potential bundle of access rights and the existing access rights respectively assigned to one or more users determining the impact a particular candidate bundle of access rights would have on the existing access right(s) assigned to users of a computing system if that bundle was defined as a corresponding role and used to replace such existing access right(s), and the like. The instructions may cause or enable the role discoverer 102 to select one or more candidate bundle(s) of access rights to propose (e.g., recommend) as a role.

Role definition instruction module 135 may store instructions and/or data that may cause or enable the role discoverer 102 to define one or more roles based on the candidate bundle(s) of access rights selected by the candidate access right bundle evaluation instruction module 133. The role(s) may be defined according to the particular architecture and specification of an RBAC computing system. Such instructions may also apply constraints when defining the role(s). For instance, a role may be required to include a minimum number of access rights, a role may be required to apply to a minimum number of users, and a role may be required to provide a minimum amount of coverage (e.g., number of permissions×number of users). The instructions may also cause or enable the role discoverer 102 to determine which user(s) of a computing system should be assigned to (or otherwise associated with) the defined role(s). To determine whether a user should be assigned to a defined role, the access rights of the defined role may be compared to the set of access rights assigned to the user in order to determine a similarity between the two. For instance, a minimum level of similarity may be required to determine to assign the defined role to the user. Similarity between defined roles and access rights will be discussed in further detail below.

Access right update instruction module 137 may store instructions and/or data that may cause or enable the role discoverer 102 to update the access rights assigned to the users of a computing system. As noted above, such updates may include replacing one or more existing access rights with one or more roles defined by the role definition instruction module 135. Such instructions may, as described above, cause or enable the role discoverer 102 to use an access right provisioner (e.g., access right provisioner 106) to deploy the updates to the access rights. Additionally or alternatively, the instructions may cause or enable the role discoverer 102 to directly update the access right data stored in a data store (e.g., data store 104).

It should be appreciated that the instruction modules depicted in FIG. 1B are provided by way of example only to describe various aspects and principles associated with the disclosures herein. Other examples may include additional and/or alternative instruction modules that impart additional functionality to a role discoverer. It should also be appreciated that other examples may omit one or more of the instruction modules described above and/or include individual instruction modules that combine the functionality of multiple instruction modules described above.

Figure 2:
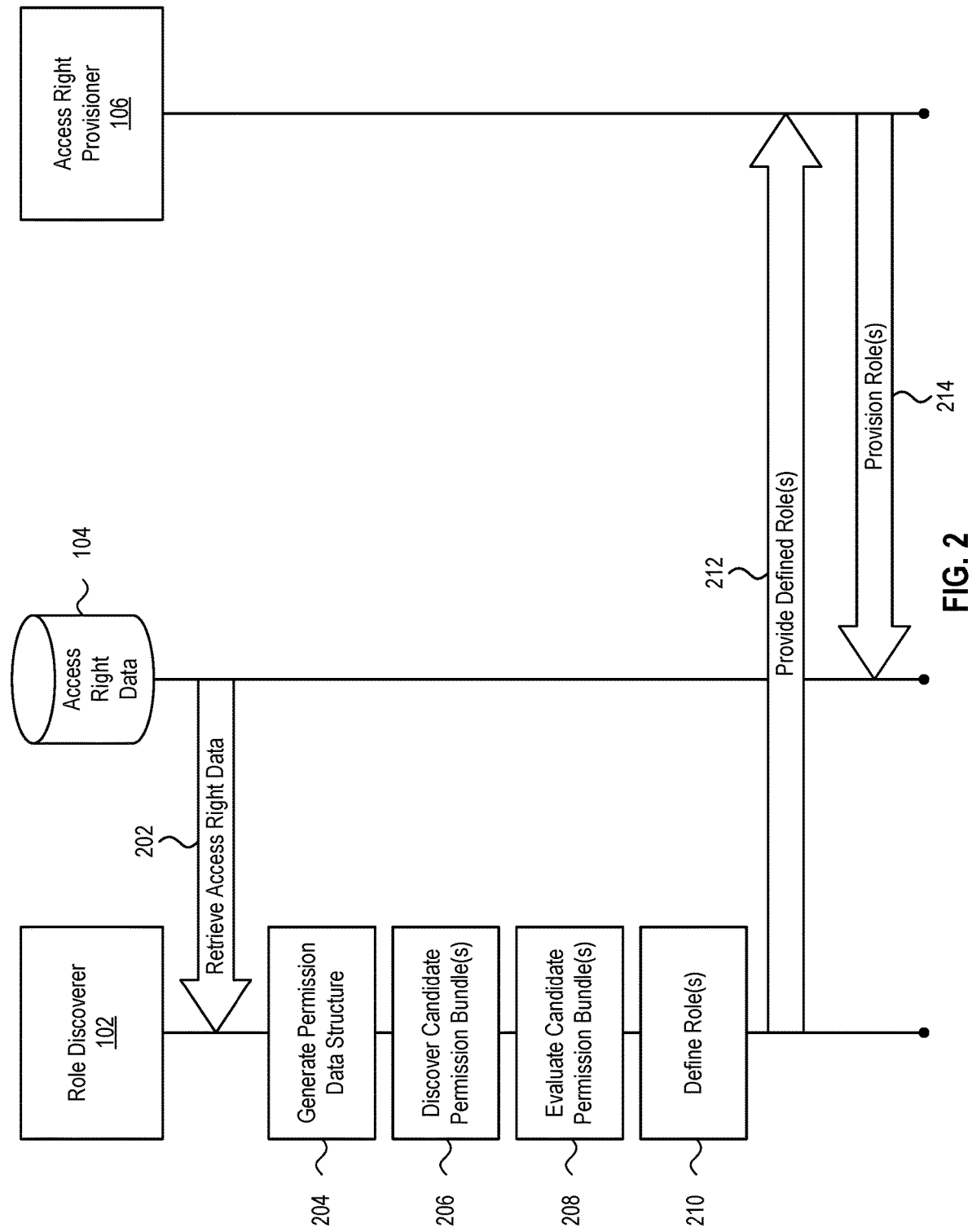
FIG. 2 depicts an example event sequence for implementing role discovery functions in accordance with one or more aspects described herein.

FIG. 2 depicts an example event sequence for implementing role discovery functions in accordance with one or more aspects described herein. FIG. 2 is described by way of example in the context of defining roles based on bundles of permissions assigned to users of a computing system. The events shown in FIG. 2 may be performed in other contexts as well, e.g., defining roles based on bundles of entitlements and/or other types of access rights assigned to users of a computing system.

In FIG. 2, at step 202, the role discoverer 102 may retrieve access right data from the data store 104. Such retrieval may be triggered by user input received from an operator of the role discoverer 102 (e.g., an IT administrator), by an instruction received from another computing device, or by the expiration of a time period. In other words, the role discoverer 102 may retrieve access right data in response to receipt of a request (e.g., from an operator or other computing device) and/or automatically (e.g., a regular or irregular intervals).

At step 204, the role discoverer 102 may generate a data structure corresponding to the permissions characterized by the access right data retrieved from the data store. The role discoverer 102 may generate the data structure in accordance with an FP-growth algorithm. Accordingly, the data structure may be a tree data structure in which the nodes of the tree respectively correspond to the permissions indicated in the access right data and the paths through the branches of the tree respectively correspond to the sets of access rights assigned to the users of the computing system. Generation of the tree data structure in accordance with an FP-growth algorithm will be discussed further below with reference to FIGS. 3A-E.

At step 206, the role discoverer 102 may generate one or more candidate permission bundles based on the generated data structure. To generate the candidate permission bundles, the role discoverer 102 may traverse the data structure and apply one or more constraints during the traversing. Where the data structure is a tree data structure, the role discoverer 102 may traverse the tree data structure in accordance with an FP-Growth algorithm. Traversal of the tree data structure and the application of constraints during such traversal will be discussed in further detail below with reference to FIGS. 3E-F.

At step 208, the role discoverer 102 may evaluate one or more of the generated candidate permission bundles according to various criteria. Such criteria may include a confidence that a particular candidate permission bundle should include one or more particular permissions, whether the candidate permission bundle includes a threshold number of permissions, the similarity between a particular candidate permission bundle and the existing set of access rights assigned to a user, a determination of the impact a role based on the candidate permission bundle would have on the existing access rights assigned to users of a computing system if that role replaced at least some of those existing access rights, and the like. Evaluation of the generated candidate permission bundles may also include ranking the generated bundles and/or selecting one or more of the generated bundles to use for defining a corresponding role of an RBAC computing system.

At step 210, role discoverer 102 may define one or more roles based on the selected candidate permission bundles. The permissions of a defined role may correspond to the permissions of a selected candidate permission bundle. As noted above, the role discoverer 102 may define roles in accordance with various constraints such as requiring the role to include a minimum number of permissions, requiring applicability of the role to a minimum number of users, and requiring the role to provide a minimum coverage in terms of number of permissions and users. As noted above, the role discoverer 102 may also determine which user(s) of the computer system should be assigned (or otherwise associated with) the defined role(s). Such determinations may be based on a similarity between the permissions of the defined roles and the set of permissions respectively assigned to the users.

At step 212, the role discoverer 102 may provide the defined roles to the access right provisioner 106. The role discoverer 102 may also provide the access right provisioner 106 with an indication of which user(s) the provided role(s) should be assigned to (or otherwise associated with).

At step 214, the access right provisioner 206 may provision the defined role(s) by updating the access right information at the data store 204. As noted above, provisioning the role(s) may include updating the access right data by, for example, revoking one or more access rights from the user(s) of a computing system and assigning one or more of the defined role(s) to those users. The access right provisioner 206 may be configured to assign the defined role(s) to the user(s) in accordance with the particular RBAC architecture and configuration of the computing system.

The event sequence shown in FIG. 2 is but one example of such an event sequence. Additional and/or alternative events may be added or omitted in other example event sequences without departing from the scope of the disclosures.

FIGS. 3A-G depict example output during an example role discovery process in accordance with one or more aspects described herein. As noted above, the role discovery process may use an FP-Growth algorithm to discover candidate access right bundles.

Referring to FIG. 3A, an example entitlement table 300 is shown. The entitlement table 300 may be based on the access right data obtained by a role discoverer. The entitlement table 300 in this example indicates a set of permissions (Permission 1-6) that are respectively assigned to a set of users (Users 1-5). For example, User 1 has the following set of permissions: {Permission 1, Permission 2, Permission 3}, and User 5 has the following set of permissions: {Permission 2, Permission 4, Permission 6}. The respective sets of permissions for Users 2-4 will be appreciated with reference to the entitlement table 300 shown in FIG. 3A. One example of a frequent pattern among the entitlements depicted in the entitlement table 300 may be {Permission 1, Permission 2}, which are both assigned to User 1 and User 4. Accordingly, the role discovery process may propose and/or recommend a role that includes Permission 1 and Permission 2, and that role may be assigned to User 1 and User 4 in lieu of the individual permissions. That role may thus replace the four individual permissions (two Permission 1s and two Permission 2s) assigned to User 1 and User 4. In accordance with an FP-Growth algorithm, the role discoverer may first obtain access right data that characterizes the sets of permissions assigned to the users of a computing system as shown by way of example in the entitlement table 300.

Referring to FIG. 3B, an example support count table 302 is shown. The support counts in the support count table 302 are based on the permissions indicated in the entitlement table 300. In the context of the access right data depicted in the entitlement table 300, the support counts in the support count table 302 indicate the respective number of times the permissions appear in the entitlement table 300. In other words, the support counts in the support count table 302 indicate the number of times the permissions are respectively assigned to the users as characterized in the access right data. For example, support count table 302 indicates that Permission 2 has a support count of 5 (i.e., assigned to five users) and that Permission 6 has a support count of 1 (i.e., assigned to only one user). In accordance with an FP-Growth algorithm, the role discoverer may process the access right data indicated in the entitlement table 300 to obtain the respective support counts of the permissions as indicated in the support count table 302. Support count may also be referred to herein as the frequency of an access right.

Referring to FIG. 3C, an example ordered item set table 304 is shown. In the context of the access right data depicted in the entitlement table 300, the item set of the ordered item set table 304 refer to the set of permissions (Permissions 1-6). The ordered item set table 304 in this example orders the permissions in descending order according to their support count. Accordingly, Permission 2 with the highest support count (e.g., 5) appears at the top of the ordered item set table 304 and Permissions 3, Permission 5, and Permission 6 with the lowest support counts (e.g., 1) appear at the bottom of the ordered item set table 304. In accordance with an FP-Growth algorithm, the role discoverer may order the permissions as indicated in the ordered item set table 304 based on the support counts for those permissions in the support count table 302.

To reduce the potential sets of access rights to consider for possible role definition, the role discoverer may apply one or more constraints to the access rights identified from the access right data obtained. For instance, the role discoverer may apply a minimum frequency constraint that excludes access rights with the lowest x % (e.g., 30%) of frequencies. Accordingly, the role discoverer may use the ordered item set table 304 to determine which access rights correspond to the lowest x % of frequencies. As an example, applying a minimum frequency constraint of 25% to a set of permissions with a maximum support count of 60 would exclude those permissions having frequencies lower than 15.

Figures 3D, 3E:
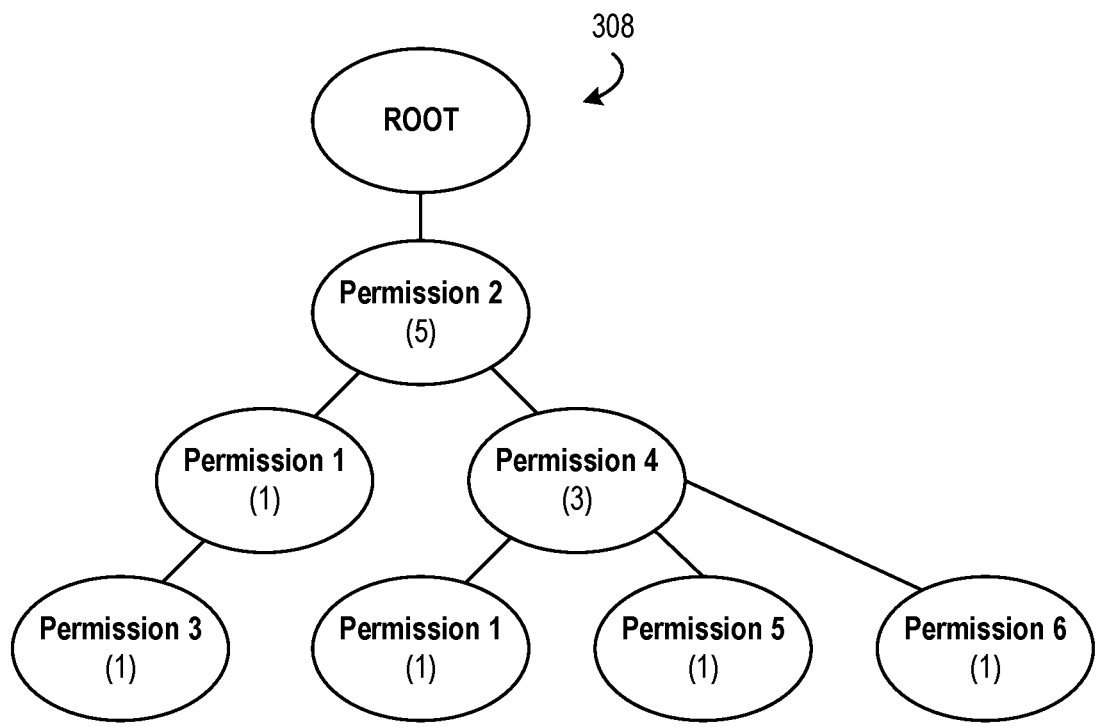

Referring to FIG. 3D, an example of an ordered permission set table 306 is shown. The permission set table 306 in this example indicates the respective sets of permissions for the users (e.g., Users 1-5) in which the permissions of those sets are ordered according to the ordering of the permissions in the ordered item set table 304. For instance, the set of permissions for User 1, ordered according to the ordered item set table 304, is: {Permission 2, Permission 1, Permission 3}. The respective sets of permissions for Users 2-5, ordered according to the ordered item set table 304, will be appreciated with reference to FIG. 3D. In accordance with an FP-Growth algorithm, the role discoverer may determine the ordered permission sets for the users as indicated in the ordered permission set table 306 based on the ordered item set table 304.

Referring FIG. 3E, an example tree data structure 308 is shown. In accordance with an FP-Growth algorithm, the role discoverer may generate the tree data structure based on the ordered permission set table 306. As seen in FIG. 3E, the tree data structure 308 includes a root node, and each node in the tree data structure 308 that directly or indirectly stems from the root node corresponds to one of the permissions indicated in the entitlement table 300. Furthermore, each path from the root node to a leaf node (i.e., a branch) of the tree data structure 308 corresponds to one of the ordered permission sets indicated in the ordered permission set table 306. For instance, the tree data structure 308 in this example includes the following branch from the root node: Permission 2→Permission 1→Permission 3 (leaf node), which corresponds to the ordered permission set, {Permission 2, Permission 1, Permission 3}, for User 1 as indicated in the ordered permission set table 306.

As noted above, the role discoverer may generate the tree data structure 308 in accordance with an FP-Growth algorithm. Accordingly, the role discoverer may process the ordered permission sets of the ordered item set table 306 to add or update nodes of the tree data structure 308. For instance, as seen in FIG. 3E, the role discoverer may in this example first process the ordered permission set for User 1—{Permission 2, Permission 1, Permission 3}. The role discoverer may first add a new node corresponding to Permission 2 as a child of the root node. Another new node corresponding to Permission 1 may then be added as a child of the node corresponding to Permission 2, and a new node (a leaf node) corresponding to Permission 3 may be added as a child of the node corresponding to Permission 1. The nodes of the tree data structure may also indicate (or otherwise be associated with) a count of the permission corresponding to that node. This count is different than the support counts indicated in the support count table 304 (FIG. 3C) which indicate the total count of the permissions indicated in the entitlement table 300 (FIG. 3A). Rather, the count of the permissions in the nodes of the tree data structure 308 (e.g., "(1)" or "(5)") indicates the number of times that permission has been encountered in that particular branch of the tree data structure 308 during the generation process. For instance, after processing the ordered permission set for User 1 as described above, the respective counts would be "(1)" for each of the nodes corresponding to Permission 2, Permission 1, and Permission 3. The role discoverer may then process the ordered permission set for User 2—{Permission 2, Permission 4, and Permission 5}. The role discoverer may first determine that the tree data structure already includes a node corresponding for Permission 2. Accordingly, rather than create a new node, the role discoverer may instead increment the count corresponding to Permission 2 (e.g., from "(1)" to "(2)"). The role discoverer may then determine that the node corresponding to Permission 2 does not have a child node corresponding to Permission 4, the next permission in the ordered permission set for User 2. The role discoverer may thus add a new node corresponding to Permission 4 (with a count of "(1)") as a child of the node corresponding to Permission 2. Another new node corresponding to Permission 1 (also with a support count of "(1)") may then be added as a child of the node corresponding to Permission 4.

The role discoverer may continue constructing the tree data structure 308 in this fashion based on the ordered permission sets for Users 3-5 adding new nodes and/or updating the counts for the nodes as needed. Accordingly, once all ordered permission sets have been processed, the count for the node corresponding to Permission 2 is "(5)" because that permission appears in the ordered permission sets for all of the Users 1-5. In addition, as seen in FIG. 3E, the tree data structure 308 in this example includes two nodes corresponding to Permission 1: one node for the Permission 2→Permission 1 branch (corresponding to the ordered permission set for User 1), and another node for the Permission 2→Permission 4→Permission 1 branch (corresponding to the ordered permission set for User 4).

Having generated the tree data structure 308, the role discoverer may traverse the tree data structure to identify frequent patterns of permissions. The role discoverer may traverse the tree data structure 308 in accordance with an FP-Growth algorithm. In this regard, the role discoverer may traverse the tree data structure starting from the leaf nodes of the tree data structure 308. As noted above, the role discoverer may apply various constraints during the traversal of the tree data structure 308 in order to exclude certain frequent patterns from those used to determine candidate permission bundles. By applying constraints such as those described below when traversing a tree data structure, the total number of potential access right bundles to evaluate and consider for potential role definitions may be significantly reduced.

One example constraint that may be applied when traversing a tree data structure retains only "in-order" frequent patterns. As used herein, an "in-order" frequent pattern refers to a frequent pattern that preserves the parent-child relationship of the nodes of a branch of a tree structure. For instance, the "in-order" frequent patterns of the Permission 2→Permission 1→Permission 3 branch of the example tree data structure 308 would include: {Permission 2, Permission 1, Permission 3}, {Permission 2, Permission 1}, and {Permission 1, Permission 3}, because these frequent patterns preserve the parent-child relationship of the nodes corresponding to these permissions. On the other hand, while {Permission 2, Permission 3} might be a frequent pattern observed in the tree data structure 308, it would not constitute an "in-order" frequent pattern because the node corresponding to Permission 3 is not a direct child of the node corresponding to Permission 2. Accordingly, the "in-order" frequent pattern constraint may exclude some of the possible combinations of frequent patterns corresponding to the branches of the tree data structure corresponding to the set(s) of access rights assigned to the users.

Another example constraint that may be applied when traversing a tree data structure treats nodes with the same counts as a single frequent pattern. For instance, a tree data structure may include the following branch: Node A→Node B→Node C. If the respective counts (n) for these nodes were all the same (e.g., $n_a=n_b=n_c$), then applying this constraint may retain only a single frequent pattern corresponding to this branch: {Node A, Node B, Node C}. If the respective counts for only two of the nodes (e.g., Node A and Node B) were the same (e.g., $n_a=n_b$, $n_c<n_a$, $n_b$), then applying this constraint may retain two frequent patterns corresponding to this branch: {Node A, Node B} and {Node A, Node B, Node C}. If the respective counts for the three nodes were all different (e.g., $n_a \neq n_b \neq n_c$), then applying this constraint may retain three frequent patterns corresponding to this branch: {Node A, Node B}, {Node B, Node C}, and {Node A, Node B, Node C}.

The role discoverer may apply one or more of the constraints described above when traversing the tree data structure. Additional and alternative constraints may also be applied when traversing the tree data structure. Furthermore, where other types of data structures are used to represent the set(s) of access rights assigned to the users of a computing system, the role discoverer may apply other types of constraints when traversing those data structures to identify candidate permission bundles.

Figure 3F:
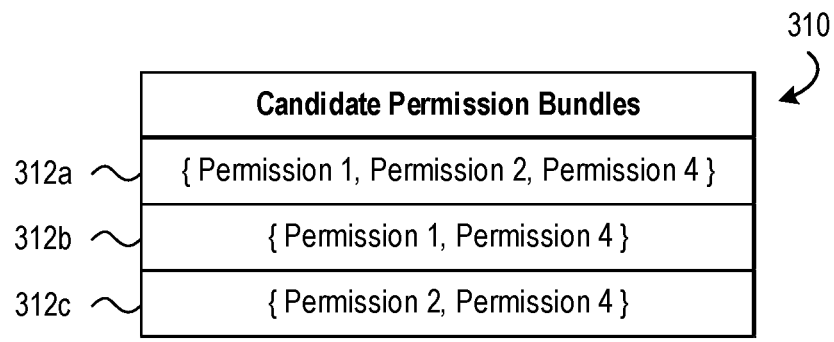

Referring to FIG. 3F, an example candidate permission bundle table 310 having example candidate permission bundles 312a-c is shown. These candidate permission bundles 312a-c may represent some of the candidate permission bundles identified by the role discoverer based on its traversal of the tree data structure 308 (FIG. 3E). Accordingly, it should be appreciated that the candidate permission bundles 312a-c are provided by way of example only and that additional and/or alternative candidate permission bundles may be identified depending on the constraints applied during the traversal of the data structure (e.g., a tree data structure) corresponding to the set(s) of access right represented in the data structure.

The sets of access rights included in the candidate permission bundle table 310 are referred to herein as "candidate" permission bundles because the role discoverer might further exclude from consideration as a potential role one or more set(s) of access rights identified when traversing the data structure. In this regard, the role discoverer may apply one or more additional constraints to the candidate permission bundle(s) identified. For instance, the role discoverer may apply a minimum permission constraint that excludes one or more candidate permission bundles from consideration as a potential role. The minimum permission constraint may require a candidate permission bundle to include a threshold number of permissions (e.g., at least three permissions) to be considered as a potential role to define for the users of the computing system.

The role discoverer may also perform one or more evaluations of the candidate permission bundle(s) included in the candidate permission bundle table 310. Such evaluations may include, for example, an evaluation of the similarity between a candidate permission bundle and the sets of access rights respectively assigned to the users, an evaluation of the confidence that a permission should be included in a potential role, an evaluation of the number of users that may be eligible to be assigned to a role corresponding to a candidate permission bundle, an evaluation of the extent to which a candidate permission bundle covers the permissions assigned to the users, and the like. Such evaluations may indicate the impact a candidate permission bundle would have on the access rights assigned to users of a computing system if defined as a role and assigned to those users in lieu of the individual permissions.

A similarity evaluation may, for example, determine a similarity between the set of access rights indicated in a candidate permission bundle and the current set of access rights (e.g., permissions) assigned to a user. To determine such similarity, the Jaccard index (intersection over union) may be used. In some examples, the union may be the set of all permissions under consideration, e.g., the super set of all permissions in all candidate permission bundles. The coefficient of the Jaccard index may thus correspond to the similarity between these two sets of access rights. As an example, a candidate permission bundle may indicate the following set of permissions: {Permission 1, Permission 3, Permission 5}, and a user may be currently assigned the following set of permissions: {Permission 1, Permission 3, Permission 7}. Evaluating the similarity of these example sets of permissions using the Jaccard index would thus yield a similarity coefficient of 0.67 (or 67%):

intersection: {Permission 1, Permission 3}
union: {Permission 1, Permission 3, Permission 5}
intersection/union: {Permission 1, Permission 3}/{Permission 1, Permission 3, Permission 5}=2/3=0.67 (or 67%)

The similarity evaluation may thus be used to determine which users and, in turn, how many users of the computing system may be eligible to be assigned to a role corresponding to a particular candidate bundle of permissions if defined as a role. The role discoverer may also apply a minimum similarity constraint to determine whether a user would be eligible to be assigned a role. The minimum similarity constraint may indicate a threshold similarity x or x % (e.g., 0.8 or 80%) between a candidate permission bundle and a user's currently assigned set of permissions in order for that user to be eligible to be assigned to a role corresponding to that bundle of permissions.

A confidence evaluation may, for example, determine a confidence that a candidate access right bundle should include a particular access right (e.g., permission). As an example, a confidence evaluation may be performed to determine a confidence that a candidate permission bundle that includes Permission 1 should also include Permission 2, in other words that any role defined based on this candidate permission bundle should include this pair of permissions. Stated differently, the confidence evaluation may determine a confidence that Permission 1 (the antecedent) implies Permission 2 (the consequent). This confidence may be based on the permissions currently assigned to the users of the computing system as indicated in the access right data obtained by the role discoverer. To determine whether one access right (e.g., permission) implies another, a confidence evaluation may determine the frequency with which both the antecedent access right and the consequent access right are currently assigned to the users relative to the antecedent access right alone.

As another example, if four (4) users are assigned Permission 1 and three (3) of those users are also assigned Permission 2, then the confidence that Permission 1 (antecedent) implies Permission 2 (consequent) would be 0.75 (or 75%):

$$\text{Confidence} =$$
$$\text{Frequency(Antecedent \& Consequent)/Frequency(Antecedent)} =$$
$$\text{Frequency(Permission 1 \& Permission 2)/Frequency(Permission 1)} =$$
$$3/4 = 0.75\ (75\%)$$

The confidence evaluation may thus be used to determine which candidate permission bundles to select and/or recommend as a role. For instance, the role discoverer may apply a minimum confidence constraint to determine whether to select and/or recommend a candidate permission bundle for a role definition. The minimum confidence constraint may indicate a threshold confidence x or x % (e.g., 0.9 or 90%) that one or more of the permissions in a candidate permission bundle must satisfy for the role discoverer to select and/or recommend the candidate permission bundle for role definition. In some examples, the role discoverer may determine a confidence for each access right in the candidate bundle of access rights with respect to each of the other access rights in the bundle. Accordingly, in some examples, multiple respective confidences may be determined for each access right in a candidate access right bundle in which the respective confidences determined for an access right indicate the confidence that the access right implies another one of the access rights of the bundle. In some examples, a minimum confidence constraint may require all confidences for each access right of the bundle to satisfy a confidence threshold for the bundle to be selected and/or recommended for role definition. In other examples, a minimum confidence constraint may require the average confidence for each access right to satisfy a confidence threshold. Additional and alternative examples of confidence evaluations and minimum confidence constraints will be appreciated based on the disclosures herein.

An eligibility evaluation may, for example, determine the number of users that would be eligible to be assigned a role based on a particular candidate access right bundle. As described above, the role discoverer may perform a similarity evaluation to determine the similarity between a candidate access right bundle and the current set of access rights (e.g., permissions) assigned to that user. The role discoverer may thus perform the similarity evaluation to determine the total number of users that would be eligible to be assigned to a role based on a particular access right bundle. The role discoverer may also apply a minimum eligibility constraint to determine whether to select and/or recommend a candidate access right bundle for role definition. The minimum eligibility constraint may indicate a threshold number x of users (e.g., 10 users) that must be eligible to be assigned to role corresponding to the candidate bundle of access rights for the role discoverer to select and/or recommend that bundle for role definition.

A coverage evaluation may, for example, determine the scope of coverage a candidate access right bundle would provide if defined as a role to assign the users of a computing system. The scope of coverage may, for example, be based on the total number of users eligible to receive the role and the size of the role, e.g., the total number of access rights (e.g., permissions) included in the role. The role discoverer may thus determine a coverage value x corresponding to the role size (e.g., total number of permissions) multiplied by the total number of eligible users. The role discoverer may also apply a minimum coverage constraint to determine whether to select and/or recommend a candidate access right bundle for role definition. The minimum coverage constraint may thus indicate a threshold coverage value x that a candidate access right bundle must satisfy for the role discoverer to select and/or recommend that bundle for role definition.

It should be appreciated that a role discoverer may apply one, some, or all of the constraints described above when performing the role discovery process as well as additional and/or alternative constraints that will be appreciated upon review of the disclosures herein. It should also be appreciated that a role discoverer may perform one, some, or all of the evaluations described above during the role discovery process as well as additional and/or alternative evaluations that will be appreciated upon review of the disclosures herein. It should further be appreciated that the role discoverer may apply the constraints and/or perform the evaluations discussed above at additional and/or alternative stages of the role discovery process. For instance, one or more of the constraints may be applied and/or one or more of the evaluations may be performed when traversing the data structure corresponding to the users' existing access rights and/or with respect to roles that have been defined based on the candidate access right bundles identified. Furthermore, the constraints applied by the role discoverer may be configurable constraints. In this regard, an operator of the role discoverer (e.g., an IT administrator) may provide user input indicating the configuration of a constraint.

Figure 3G:
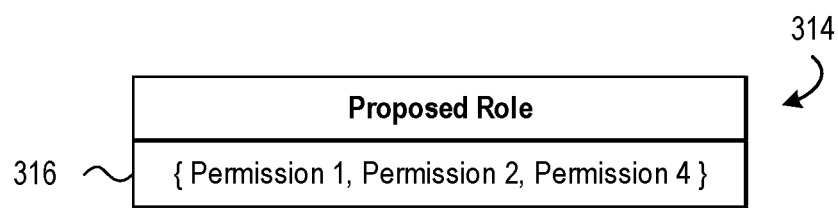

Referring to FIG. 3G, a table of proposed roles 314 having an example proposed role 316 is shown. The proposed role 316, in this example, corresponds to the candidate permission bundle 312*a* (FIG. 3F). The role discoverer may have selected candidate permission bundle 312*a* for role definition based on the constraints applied to and the evaluations performed for the other candidate permission bundles identified by traversing the tree data structure 308 (FIG. 3E) corresponding to the existing permissions of the users. The role discoverer may thus provide the proposed role 316 (or information indicating the permissions to include in the define role) to an access right provisioner that defines and/or deploys the role in the computing system. The role discoverer may also provide the access right provisioner an indication of which users are eligible to receive the define role

316. As noted above, the access right provisioner may assign the eligible users to the role and update the access right data, e.g., to revoke the individual permissions included in the role. It should be appreciated that the proposed role 316 in FIG. 3G is provided by way of example only. Additional and alternative roles may be proposed based on the constraints applied to the candidate access right bundles, the evaluations performed, and the results thereof.

Figure 4:
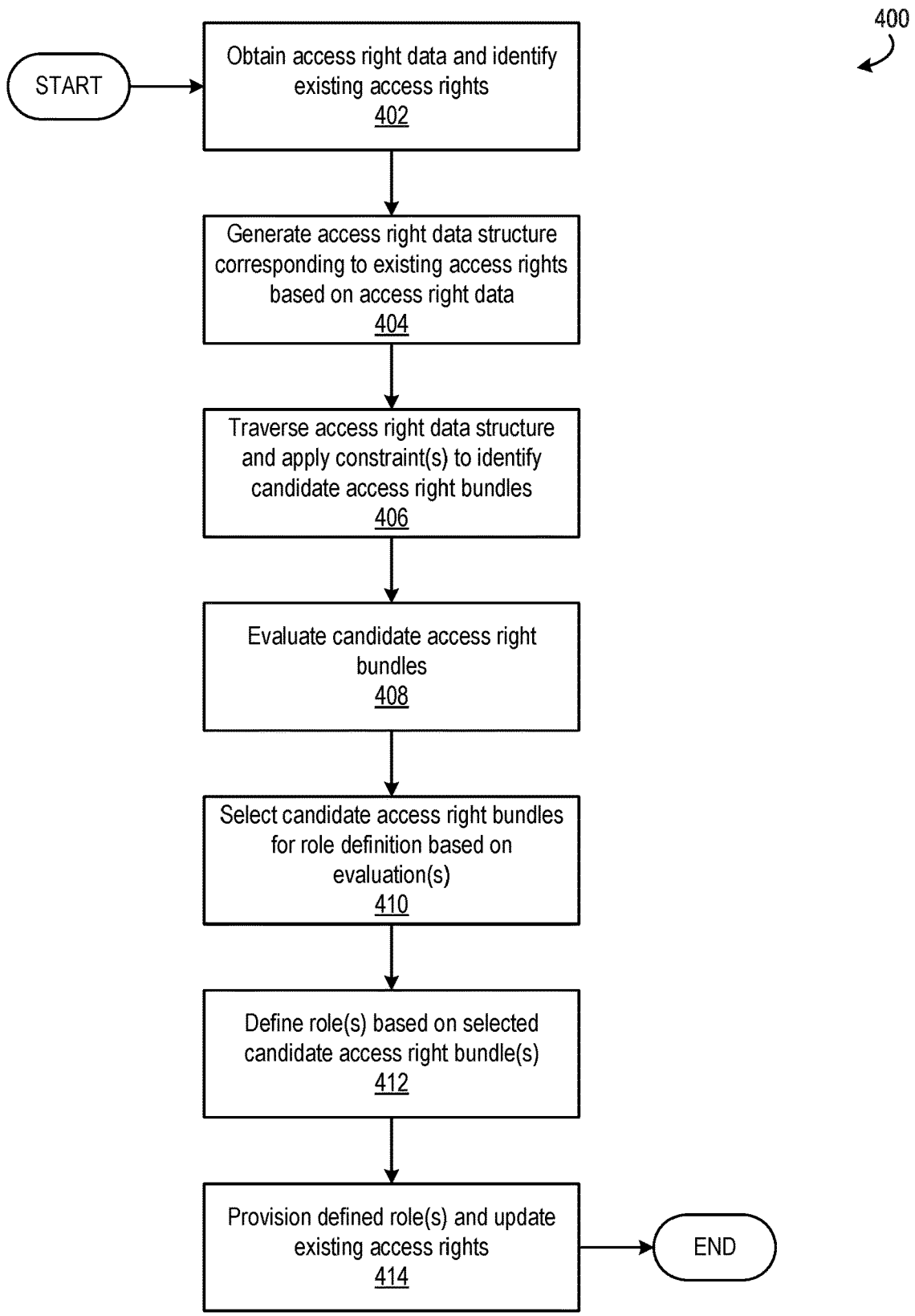
FIG. 4 depicts a flowchart of example method steps for a role discovery process.

FIG. 4 depicts a flowchart 400 of example method steps for a role discovery process in accordance with aspects described herein. The steps depicted in FIG. 4 are merely some example steps of a process for discovering potential roles based on the existing access rights assigned in a computing system. The steps shown may be performed in a different order, more steps may be added, or one or more steps may be omitted, without departing from the disclosures.

At step 402, access right data may be obtained and used to identify access rights currently assigned to the users of a computing system. As described above, the access right data may indicate permissions, entitlements, and the like that are currently assigned to those users. The access rights may or may not be physically provisioned to the users but nevertheless be entitled to be possessed by those users.

At step 404, a data structure may be generated that corresponds to the access rights indicated in the access right data obtained. As described above, the data structure may be a tree data structure in which the nodes of the tree data structure correspond to the access rights indicated in the access right data and the branches of the tree data structure correspond to the sets of access rights assigned to the users. The tree data structure may also indicate the frequency with which access rights and sets of access rights occur in the access right data. Such frequency information may be indicated in the tree data structure itself or maintained separate from the tree data structure. As noted above, the data structure may be generated using the access right data in accordance with an FP-Growth algorithm.

At step 406, the data structure may be traversed to identify candidate access right bundles. When traversing the data structure, one or more constraints such as those described herein may be applied to exclude some sets of access rights from the candidate bundles of access rights identified. As also noted above, the data structure may be traversed in accordance with an FP-Growth algorithm.

At step 408, the candidate bundles of access rights may be evaluated to select one or more of those bundles as a role for the users of the computing system. One or more evaluations such as those described herein may be performed with respect to the candidate bundles of access rights. The evaluations may, for example, evaluate the impact a candidate bundle of access rights would have if defined as a role for the users of the computing system. One or more constraints such as those described herein may also be applied when evaluating the candidate bundles of access rights to further exclude one or more bundles from consideration as a defined role.

At step 410, one or more of the candidate bundles of access rights may be selected for role definition based on the evaluation(s) performed with respect to those bundles. The candidate bundles of access rights may be automatically selected, for example, if the outcome(s) of the evaluation(s) satisfy specified criteria or meet specified thresholds for role definition such as the criteria and thresholds described herein. The candidate bundles of access rights may also be selected for presentation to an operator (e.g., an IT administrator) who reviews the selected bundles and provides input that indicates which of the selected bundles should be used to define the roles. Accordingly, the system(s) described herein may include a user interface (e.g., a graphical user interface, command line interface, and the like) that is configured to display the bundles of access rights selected on the basis of the evaluations performed and receive user input indicating which displayed bundles of access rights should be used to define a role for the users of the computing system.

At step 412, the candidate bundle(s) of access rights selected for role definition may be used to define roles in the computing system. As noted above, the roles may be defined in accordance with the architecture and requirements of an RBAC computing system. The users eligible to receive the defined roles may also be identified. At step 414, the defined roles may be respectively provisioned to the users of the computing system. The corresponding access rights the role is intended to replace may also be revoked (e.g., de-provisioned).

The steps depicted in FIG. 4 may be performed at regular or irregular intervals in order to identify new opportunities to reduce the number of access rights assigned to the users of a computing system by replacing them with defined roles. The role discovery process may be initiated automatically or on-demand.

Real-world tests have yielded significant improvements to the access rights assigned and provisioned in an enterprise-wide computing system. In one instance, a team of employees included 14 users, 28 user accounts, and 850 entitlements. By implementing the techniques described herein, three roles were suggested respectively 46, 5, and 2 permissions. All 14 users were eligible to be respectively assigned to these roles resulting in 186 consolidated entitlements down from 850 entitlements, almost an 80% reduction in entitlements, thereby rendering subsequent access right reviews much more manageable and efficient.

The above-described examples and arrangements are merely some example arrangements in which the systems described herein may be used. Various other arrangements employing aspects described herein may be used without departing from the invention.

Figure 5:
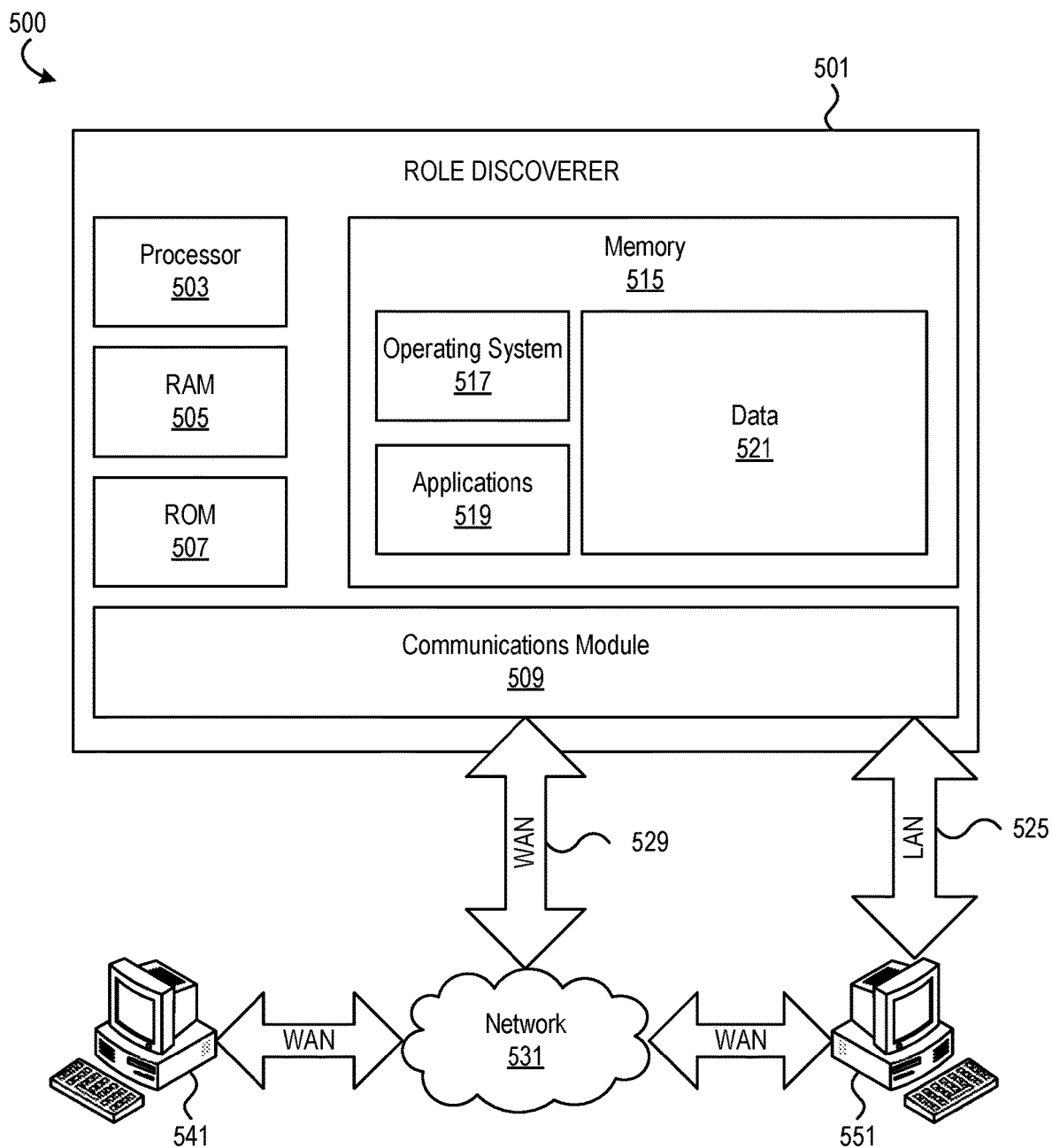
FIG. 5 depicts a block diagram of an example operating environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include role discoverer 501 having processor 503 for controlling overall operation of role discoverer 501 and its associated components, including Random Access Memory (RAM) 505, Read-Only Memory (ROM) 507, communications module 509, and memory 515. Role discoverer 501 may include a variety of computer readable media. Computer readable media may be any available media that may be accessed by role discoverer 501, may be non-transitory, and may include volatile and nonvolatile, removable and non-removable media implemented in any method or technology for storage of information such as computer-readable instructions, object code, data structures, program modules, or other data.

Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by role discoverer 501. Role discoverer 501 may be a single computing device that performs the various functions discussed herein or may include multiple computing devices that respectively perform one or more of the functions discussed herein in a coordinated fashion.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on role discoverer 501. Such a processor may execute computer-executable instructions stored on a computer-readable medium.

Software may be stored within memory 515 and/or storage to provide instructions to processor 503 for enabling role discoverer 501 to perform various functions as discussed herein. For example, memory 515 may store software used by role discoverer 501, such as operating system 517, application programs 519, and associated database 521. Also, some or all of the computer executable instructions for role discoverer 501 may be embodied in hardware or firmware. Although not shown, RAM 505 may include one or more applications representing the application data stored in RAM 505 while role discoverer 501 is on and corresponding software applications (e.g., software tasks) are running on role discoverer 501.

Communications module 509 may include a microphone, keypad, touch screen, and/or stylus through which a user of role discoverer 501 may provide input, and may also include one or more of a speaker for providing audio output and a video display device for providing textual, audiovisual and/or graphical output. Computing system environment 500 may also include optical scanners (not shown).

Role discoverer 501 may operate in a networked environment supporting connections to one or more remote computing devices, such as computing devices 541 and 551. Computing devices 541 and 551 may be personal computing devices or servers that include any or all of the elements described above relative to role discoverer 501.

The network connections depicted in FIG. 5 may include Local Area Network (LAN) 525 and Wide Area Network (WAN) 529, as well as other networks. When used in a LAN networking environment, role discoverer 501 may be connected to LAN 525 through a network interface or adapter in communications module 509. When used in a WAN networking environment, role discoverer 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
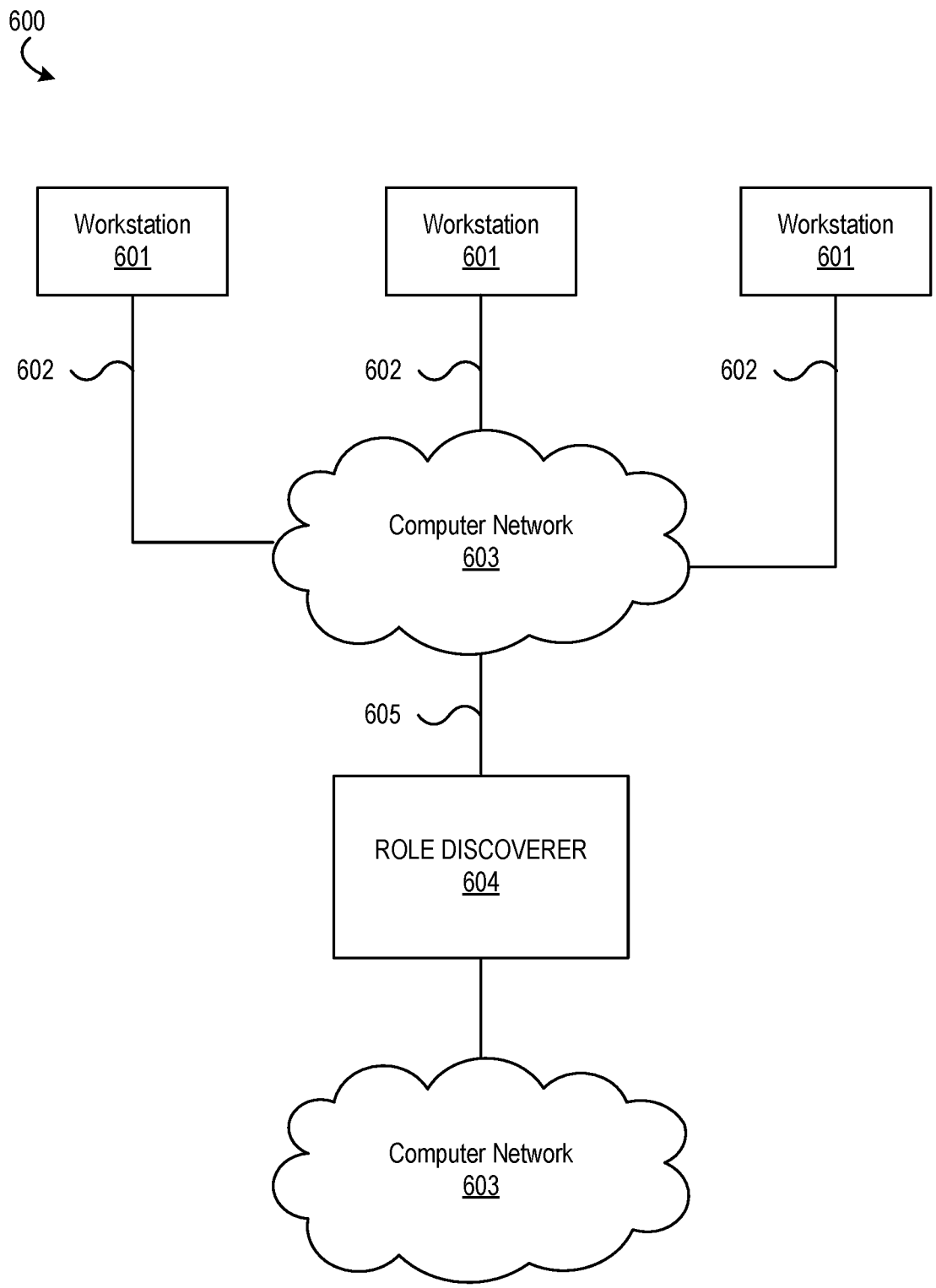
FIG. 6 depicts a block diagram of example computing devices that may be used to implement the processes and functions of certain aspects of the present disclosure in accordance with one or more aspects described herein.

FIG. 6 depicts an illustrative block diagram of workstations and servers that may be used to implement the processes and functions of certain aspects of the present disclosure in accordance with one or more example embodiments. Referring to FIG. 6, illustrative system 600 may be used for implementing example embodiments according to the present disclosure. As illustrated, system 600 may include one or more workstation computers 601. Workstation 601 may be, for example, a desktop computer, a smartphone, a wireless device, a tablet computer, a laptop computer, and the like, configured to perform various processes described herein. Workstations 601 may be local or remote, and may be connected by one of communications links 602 to computer network 603 that is linked via communications link 605 to role discoverer 604. In system 600, role discoverer 604 may be a server, processor, computer, or data processing device, or combination of the same, configured to perform the functions and/or processes described herein. Role discoverer 604 may be used to obtain access rights provisioned to users, generate and traverse an entitlement tree based on the access rights obtained, identify and evaluate candidate bundles of access rights, select bundles of access rights to define as one or more roles, cause provisioning of such roles to users, and the like.

Computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 602 and 605 may be communications links suitable for communicating between workstations 601 and role discoverer 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method of provisioning access rights in a computing system comprising:
    obtaining, by a first computing device and from a data store comprising access right data, at least a portion of the access right data that characterizes a plurality of access rights associated with a plurality of users of the computing system, wherein individual access rights of the plurality of access rights are associated with a particular computing device of the computing system;
    generating, in accordance with a frequent pattern growth algorithm (FP-growth algorithm) and based on the portion of the access right data obtained, a tree data structure corresponding to the plurality of access rights;
    identifying at least one candidate bundle of access rights at least by:
        traversing, in accordance with the FP-growth algorithm, the tree data structure; and
        applying at least one constraint during the traversing, wherein the at least one constraint excludes, from the at least one candidate bundle of access rights, at least one set of access rights represented in the tree data structure;
    performing, based on the portion of the access right data obtained, at least one evaluation of the at least one candidate bundle of access rights;
    selecting, at least based on the at least one evaluation, a candidate bundle of access rights of the at least one candidate bundle of access rights to define as a role;
    defining, for the computing system, the role based on the candidate bundle of access rights selected; and
    provisioning the role for one or more users of the plurality of users, provisioning the role including revoking the individual access rights for the one or more users of the plurality of users and assigning the candidate bundle of access rights to the one or more users of the plurality of users.

2. The method of claim 1, wherein the plurality of access rights comprises a plurality of permissions, and wherein each individual permissions of the plurality of permissions is associated with a respective computing device of the computing system.

3. The method of claim 1, wherein applying the at least one constraint excludes, from the at least one candidate bundle of access rights, a set of access rights that does not correspond to a branch of the tree data structure.

4. The method of claim 1, wherein:
    the at least one candidate bundle of access rights comprises a first set of access rights comprising a plurality of access rights having a common support count; and
    applying the at least one constraint excludes, from the at least one candidate bundle of access rights, a second set of access rights that is a subset of the first set of access rights.

5. The method of claim 1, wherein:
    determining, for each access right of the plurality of access rights and based on the access right data obtained, a support count; and
    generating the tree data structure comprises generating the tree data structure based on one or more access rights of the plurality of access rights that are associated with a particular support count that meets a support count threshold.

6. The method of claim 1, wherein:
    the at least one evaluation comprises a similarity evaluation; and
    the similarity evaluation comprises:
        determining a similarity between the candidate bundle of access rights and a set of access rights associated with a user of the computing system; and
        determining, based on the similarity, whether the user is eligible to be assigned the role corresponding to the candidate bundle of access rights.

7. The method of claim 6, wherein:
    selecting the candidate bundle of access rights at least based on the at least one evaluation comprises selecting the candidate bundle of access rights at least based on determining that the similarity meets a similarity threshold.

8. The method of claim 1, wherein:
the at least one evaluation comprises a confidence evaluation; and
the confidence evaluation comprises determining, for the candidate bundle of access rights and based on the access right data obtained, a confidence that a first access right of the candidate bundle of access rights implies a second access right of the candidate bundle of access rights.

9. The method of claim 8, wherein:
selecting the candidate bundle of access rights at least based on the at least one evaluation comprises selecting the candidate bundle of access rights at least based on determining that the confidence meets a confidence threshold.

10. The method of claim 1, wherein:
the at least one evaluation comprises an eligibility evaluation; and
the eligibility evaluation comprises determining a count of one or more users of the computing system eligible to receive the role corresponding to the candidate bundle of access rights.

11. The method of claim 10, wherein:
selecting the candidate bundle of access rights at least based on the at least one evaluation comprises selecting the candidate bundle of access rights at least based on determining that the count meets a threshold count.

12. The method of claim 1, wherein:
the at least one evaluation comprises a coverage evaluation; and
the coverage evaluation comprises determining a coverage of the candidate bundle of access rights, wherein the coverage is based on a count of one or more users of the computing system eligible to receive the role corresponding to the candidate bundle of access rights and a count of the access rights of the candidate bundle of access rights.

13. The method of claim 12, wherein:
selecting the candidate bundle of access rights at least based on the at least one evaluation comprises selecting the candidate bundle of access rights at least based on determining that the coverage meets a coverage threshold.

14. The method of claim 1, further comprising applying a minimum access right constraint.

15. The method of claim 14, wherein:
the minimum access right constraint is applied during the traversing of the tree data structure; and
applying the minimum access right constraint comprises excluding, from the at least one candidate bundle of access rights, a set of access rights having a count of access rights that does not meet a minimum access right count threshold.

16. The method of claim 14, wherein:
the minimum access right constraint is applied during an evaluation of the at least one evaluation; and
selecting the candidate bundle of access rights at least based on the at least one evaluation comprises selecting the candidate bundle of access rights at least based on determining that the candidate bundle of access rights has a count of access rights that meets a minimum access right count threshold.

17. The method of claim 1, further comprising:
providing an indication of at least one access right of the candidate bundle of access rights, wherein defining the role based on the candidate bundle of access rights comprises defining the role based on the indication of the at least one access right; and
providing an indication of at least one user eligible to receive the role, wherein provisioning the role comprises provisioning the role based on the indication of the at least one user.

18. The method of claim 1, further comprising:
receiving user input characterizing a configuration of the at least one constraint; and
configuring the at least one constraint based on the configuration received.

19. The method of claim 1, further comprising:
receiving user input characterizing a configuration of the at least one evaluation; and
configuring the at least one evaluation based on the configuration received.

20. A system comprising:
one or more processors;
a data store storing access right data characterizing a plurality of access rights associated with a plurality of users of a computing system, wherein individual access rights of the plurality of access rights are associated with a particular computing device of the computing system; and
memory storing instructions that, when executed by the one or more processors, cause the system to:
obtain, from the data store, at least a portion of the access right data;
generate, in accordance with a frequent pattern growth algorithm (FP-growth algorithm) and based on the portion of the access right data obtained, a tree data structure corresponding to the plurality of access rights;
identify at least one candidate bundle of access rights at least by:
traversing, in accordance with the FP-growth algorithm, the tree data structure; and
applying at least one constraint during the traversing, wherein the at least one constraint excludes, from the at least one candidate bundle of access rights, at least one set of access rights represented in the tree data structure;
perform, based on the portion of the access right data obtained, at least one evaluation of the at least one candidate bundle of access rights;
select, at least based on the at least one evaluation, a candidate bundle of access rights of the at least one candidate bundle of access rights to define as a role;
define, for the computing system, the role based on the candidate bundle of access rights selected; and
provision the role for one or more users of the plurality of users, provisioning the role including revoking the individual access rights for the one or more users of the plurality of users and assigning the candidate bundle of access rights to the one or more users of the plurality of users.

* * * * *

UNITED STATES PATENT AND TRADEMARK OFFICE
CERTIFICATE OF CORRECTION

PATENT NO. : 11,451,554 B2
APPLICATION NO. : 16/404871
DATED : September 20, 2022
INVENTOR(S) : Gopinathapai et al.

It is certified that error appears in the above-identified patent and that said Letters Patent is hereby corrected as shown below:

In the Claims

Column 22, Claim 2, Line 31:
Delete "permissions" and insert --permission-- therefor Signed and Sealed this
Twelfth Day of March, 2024

Katherine Kelly Vidal
*Director of the United States Patent and Trademark Office*